(12) United States Patent
Fujii (10) Patent No.: US 10,730,351 B2
(45) Date of Patent: Aug. 4, 2020

(54) PNEUMATIC TIRE

(71) Applicant: The Yokohama Rubber Co., LTD., Minato-ku, Tokyo (JP)

(72) Inventor: Hiroshi Fujii, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 752 days.

(21) Appl. No.: 15/313,070

(22) PCT Filed: May 21, 2015

(86) PCT No.: PCT/JP2015/064565
§ 371 (c)(1),
(2) Date: Nov. 21, 2016

(87) PCT Pub. No.: WO2015/178442
PCT Pub. Date: Nov. 26, 2015

(65) Prior Publication Data
US 2017/0182847 A1   Jun. 29, 2017

(30) Foreign Application Priority Data

May 22, 2014   (JP) .................................. 2014-106258

(51) Int. Cl.
*B60C 11/03*   (2006.01)
*B60C 11/12*   (2006.01)
(Continued)

(52) U.S. Cl.
CPC .......... *B60C 11/033* (2013.01); *B60C 11/005* (2013.01); *B60C 11/0306* (2013.01);
(Continued)

(58) Field of Classification Search
CPC .......................... B60C 11/0306; B60C 11/033
See application file for complete search history.

(56) References Cited

U.S. PATENT DOCUMENTS 6,446,689 B1 *  9/2002  Elkurd ................ B60C 11/0332
                                                                152/209.18
2007/0074797 A1   4/2007  Corvasce et al.
(Continued)

FOREIGN PATENT DOCUMENTS

JP   H01-297302       11/1989
JP   03169723 A  *   7/1991  ........... B60C 11/005
(Continued)

OTHER PUBLICATIONS

Machine Translation: JP-06183214-A; Sugitani, Kenichiro (Year: 2019).*
(Continued)

*Primary Examiner* — Kendra Ly
(74) *Attorney, Agent, or Firm* — Thorpe North & Western (57) ABSTRACT

A pneumatic tire includes a center land portion, intermediate land portions, and shoulder land portions, the land portions being partitioned and formed by four main grooves, and a plurality of lug grooves and sipes disposed in the land portions. The lug grooves disposed in the shoulder land portions do not communicate with the second main grooves. The groove area ratio is greater in the center region than in the shoulder regions. The distance (L1) from the tire equator to the center in the tire width direction of the first main groove is 15 to 25% of the distance (L) from the tire equator to the ground contact edge. The distance (L2) from the tire equator to the center in the tire width direction of the second main groove is 50 to 65% of the distance (L) from the tire equator to the ground contact edge.

16 Claims, 5 Drawing Sheets

(51) Int. Cl.
*B60C 11/00* (2006.01)
*B60C 11/04* (2006.01)

(52) U.S. Cl.
CPC .......... *B60C 11/0318* (2013.01); *B60C 11/04* (2013.01); *B60C 11/1236* (2013.01); *B60C 2011/0016* (2013.01); *B60C 2011/0348* (2013.01); *B60C 2011/0353* (2013.01); *B60C 2011/0355* (2013.01); *B60C 2011/0381* (2013.01); *B60C 2011/1209* (2013.01)

(56) References Cited

U.S. PATENT DOCUMENTS

| | | | |
|---|---|---|---|
| 2009/0188596 A1* | 7/2009 | Kojima | B60C 11/0309 152/209.8 |
| 2010/0186861 A1* | 7/2010 | Ishiguro | B60C 11/0306 152/209.25 |
| 2016/0001599 A1 | 1/2016 | Minami et al. | |

FOREIGN PATENT DOCUMENTS

| | | | | |
|---|---|---|---|---|
| JP | 06183214 A | * | 7/1994 | |
| JP | 07179103 A | * | 7/1995 | ......... B60C 11/0318 |
| JP | H10-100615 | | 4/1998 | |
| JP | 2010042693 A | * | 2/2010 | |
| JP | 2010-168006 | | 8/2010 | |
| JP | 2012-091736 | | 5/2012 | |
| JP | 2012-179965 | | 9/2012 | |
| JP | 2013-216184 | | 10/2013 | |
| JP | 5435175 | | 3/2014 | |
| WO | WO 2014/128933 | | 8/2014 | |

OTHER PUBLICATIONS

Machine Translation: JP-07179103-A; Sakuno, Hiroaki; (Year: 2019).*
Machine Translation: JP-03169723-A; Hamazaki, Sukeo; (Year: 2019).*
Machine Translation: JP-2010042693-A; Fukunaga, Takayuki (Year: 2019).*
International Search Report for International Application No. PCT/JP2015/064565 dated Aug. 11, 2015, 4 pages, Japan.

* cited by examiner

PNEUMATIC TIRE

TECHNICAL FIELD

The present technology relates to a pneumatic tire having four main grooves extending in the tire circumferential direction on the tread surface, and more particularly relates to a pneumatic tire with improved steering stability performance on dry road surfaces (dry performance), traveling performance on icy and snowy road surfaces (snow performance), and noise performance.

BACKGROUND ART

Conventionally, with all season pneumatic tires that are used throughout the year, both steering stability on dry road surfaces (dry performance) and traveling performance on icy and snowy road surfaces (snow performance) are required. For example, in Japanese Unexamined Patent Application Publication No. 2010-168006A, dry performance and snow performance are both provided by making the groove area ratio of lug grooves and sipes disposed in five land portions partitioned and formed by four circumferential main grooves (one center land portion, two intermediate land portions, and two shoulder land portions) in the intermediate land portions greater than that in the center land portion and the shoulder land portions.

On the other hand, it is required that the noise generated by pneumatic tires fitted to a vehicle when the vehicle passes by (pass-by noise) is reduced, to improve the noise performance. It is known that one method of improving the noise performance is, for example, to reduce the groove area ratio of the tread portion. However, reducing the groove area ratio of the tread surface has the problem that the snow performance is degraded. Also, if the overall groove area ratio on the tread surface is reduced in Japanese Unexamined Patent Application Publication No. 2010-168006A while maintaining the magnitude relationship of the groove area ratios, the good balance of the tread pattern is lost, so dry performance, snow performance, and noise performance cannot be achieved at the same time. Therefore there is a demand for further improvement of these three performances to a high level.

SUMMARY

The present technology provides a pneumatic tire with improved steering stability performance on dry road surfaces (dry performance), traveling performance on icy and snowy road surfaces (snow performance), and noise performance.

The pneumatic tire according to the present technology to achieve the above object is a pneumatic tire having four main grooves extending in a tire circumferential direction on a tread surface, the four main grooves including a pair of first main grooves disposed on either side in a tire width direction of a tire equator and a pair of second main grooves disposed on an outer side in the tire width direction of the first main grooves, five land portions partitioned and formed by the first main grooves and the second main grooves, the five land portions including a single center land portion disposed between the pair of first main grooves, a pair of intermediate land portions disposed between the first main grooves and the second main grooves, and a pair of shoulder land portions disposed on an outer side in the tire width direction of the second main grooves, a plurality of lug grooves extending in the tire width direction and a plurality of sipes extending in the tire width direction, the plurality of lug grooves and the plurality of sipes being formed in the five land portions. Of the plurality of lug grooves, shoulder lug grooves formed in the shoulder land portions do not communicate with the second main grooves. A groove area ratio Vc of a center region on a tire equator side of the second main grooves obtained as a ratio of a sum total of a groove area of the lug grooves and the sipes included in the center land portion and the intermediate land portions to an area of the center land portion and the intermediate land portions, and a groove area ratio Vs of the shoulder regions between the second main grooves and ground contact edges obtained as a ratio of a sum total of a groove area of the lug grooves and the sipes included in the shoulder land portions to an area of the shoulder land portions satisfy a relationship Vc>Vs. A distance from the tire equator to a center in the tire width direction of the first main grooves is set in a range from 15 to 25% of a distance from the tire equator to the ground contact edge. Also a distance from the tire equator to a center in the tire width direction of the second main grooves is set in a range from 50 to 65% of the distance from the tire equator to the ground contact edge.

In the present technology, because the shoulder lug grooves do not communicate with the second main grooves as described above, radiation of pattern noise to the outside of a vehicle is reduced, so the noise performance is improved, and the land portion stiffness is improved so the dry performance can be improved. On the other hand the groove area ratio is increased in the center region, where the ground contact pressure is relatively large, so the traveling performance on icy and snowy road surfaces can be improved. Also, the first main grooves and the second main grooves are arranged within prescribed ranges, and in particular, the second main grooves are arranged closer to the tire equator than conventionally, so the noise performance is improved by reducing the degradation of pattern noise, and the dry performance can be improved.

In the present technology, preferably the center land portion is configured as a single rib continuous in the tire circumferential direction, and the intermediate land portions are configured as rows of blocks in which a plurality of blocks are arranged in the tire circumferential direction. By configuring the center land portion as a rib in this way, the stiffness of the center land portion is increased, improving the response, and the dry performance can be improved. Also, by configuring the intermediate land portions as rows of blocks, snow traction can be ensured, and the snow performance can be increased.

In the present technology, preferably the shoulder land portions include an auxiliary groove extending in the tire circumferential direction, having a groove width from 10 to 25% of a groove width of the second main groove. This reduces the degradation of the pattern noise and ensures traction in the turning direction on icy and snowy road surfaces, and the snow performance can be improved.

In the present technology, preferably a ratio Vc/Vs of the groove area ratio Vc of the center region and the groove area ratio Vs of the shoulder regions satisfies a relationship $1.03<Vc/Vs<1.10$. By setting the groove area ratios within the prescribed range, the difference in stiffness of each land portion is prevented from being excessive, which is advantageous for both the snow performance and the dry performance.

In the present technology, preferably a plurality of point heights are disposed intermittently in a groove side wall on the tire equator side of the second main grooves, forming portions where a block width is relatively small and portions where the block width is relatively large in blocks from which the intermediate land portions are configured, and a length in the circumferential direction of the portions where the block width is relatively large is greater than a length in the circumferential direction of the portions where the block width is relatively small. By increasing the groove area of the second main grooves in this way, the snow performance can be improved. Also, by increasing the length in the circumferential direction of the portion with relatively large block width, the block stiffness can be maintained, so the dry performance can be improved.

In the present technology, preferably a tread pattern formed on a surface of the tread portion has a pitch arrangement that includes two or more pitch lengths, and a maximum/minimum pitch length ratio in the pitch arrangement is in a range from 1.25 to 1.40. By making the ratio of pitch lengths small in this way, the variation in stiffness of each block is reduced, so the dry performance can be improved.

In the present technology, preferably the tread portion is configured from two or more rubber layers laminated in a tire radial direction, a JIS (Japanese Industrial Standard) hardness of rubber from which a rubber layer on an outermost side in the tire radial direction is configured is from 60 to 70, the JIS hardness of the rubber from which the rubber layer on the outermost side in the tire radial direction is configured is less than a JIS hardness of rubber from which a rubber layer on an innermost side in the tire radial direction is configured, and the hardness difference is from 10 to 15. This configuration can both achieve a high level of dry performance and snow performance. Note that in the present technology, JIS hardness refers to the durometer hardness in accordance with JIS K 6253, and is a value measured using a type A durometer.

In the present technology, when the tread portion is configured from two or more rubber layers laminated in the tire radial direction, preferably a brittle temperature of the rubber from which the rubber layer on the outermost side in the tire radial direction is configured is −45° C. or lower. This configuration can obtain good snow performance. Note that in the present technology the brittle temperature is measured in accordance with JIS K 6261.

In the present technology, the tire ground contact edge is the position of the edge in the tire axial direction when the tire is mounted on a regular rim and inflated to a regular internal pressure, and placed vertically upon a flat surface with a regular load applied thereto. A "regular rim" is a rim defined by a standard for each tire according to a system of standards that includes standards on which tires are based, and refers to a "standard rim" in the case of Japan Automobile Tyre Manufacturers Association (JATMA), refers to a "Design Rim" in the case of Tire and Rim Association (TRA), and refers to a "Measuring Rim" in the case of European Tyre and Rim Technical Organisation (ETRTO). "Regular inner pressure" is the air pressure defined by standards for each tire according to a system of standards that includes standards on which tires are based, and refers to a "maximum air pressure" in the case of JATMA, refers to the maximum value in the table of "TIRE ROAD LIMITS AT VARIOUS COLD INFLATION PRESSURES" in the case of TRA, and refers to the "INFLATION PRESSURE" in the case of ETRTO. "Regular inner pressure" is 180 kPa for a tire on a passenger vehicle. "Regular load" is the load defined by standards for each tire according to a system of standards that includes standards on which tires are based, and refers to "maximum load capacity" in the case of JATMA, to the maximum value in the table of "TIRE ROAD LIMITS AT VARIOUS COLD INFLATION PRESSURES" in the case of TRA, and to "LOAD CAPACITY" in the case of ETRTO. If the tire is for use with a passenger vehicle, a load corresponding to 88% of the loads described above is used.

DETAILED DESCRIPTION

A configuration of the present technology will be described below in detail with reference to the accompanying drawings.

Figure 1:
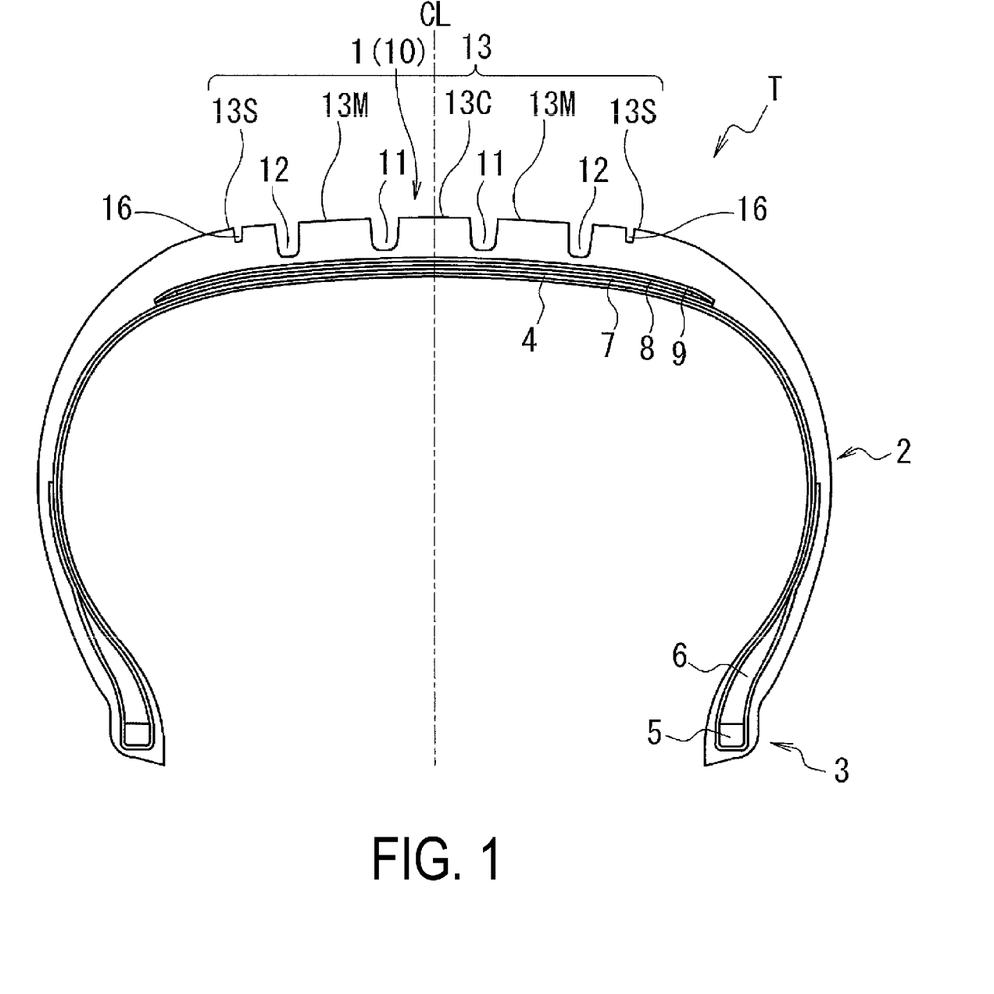
FIG. 1 is a meridian cross-sectional view of a pneumatic tire according to an embodiment of the present technology.

The reference sign CL in FIG. 1 indicates the tire equator. A pneumatic tire T includes a tread portion 1, a side wall portion 2, and a bead portion 3. A carcass layer 4 extends between the left-right pair of bead portions 3. The carcass layer 4 includes a plurality of reinforcing cords extending in a tire radial direction, and is folded back around a bead core 5 disposed in each of the bead portions 3 from a tire inner side to a tire outer side. Additionally, a bead filler 6 is disposed on the periphery of the bead core 5, and the bead filler 6 is enveloped by a main body portion and a folded back portion of the carcass layer 4. On the other hand, in the tread portion 1, a plurality of belt layers 7, 8 (two layers in FIG. 1) are embedded on the outer peripheral side of the carcass layer 4. Each of the belt layers 7, 8 includes a plurality of reinforcing cords inclined with respect to the tire circumferential direction, and the reinforcing cords are disposed between the layers intersecting with each other. In the belt layers 7, 8, the inclination angle of the reinforcing cords with respect to the tire circumferential direction is set in the range, for example, of 10 to 40°. In addition, a belt reinforcing layer 9 is disposed on the outer circumferential side of the belt layers 7, 8. The belt reinforcing layer 9 includes organic fiber cords oriented in the tire circumferential direction. In the belt reinforcing layer 9, the angle of the organic fiber cords with respect to the tire circumferential direction is set, for example, to from 0 to 5°.

The present technology is applied to such a general pneumatic tire, however, the cross-sectional structure thereof is not limited to the basic structure described above.

Figure 2:
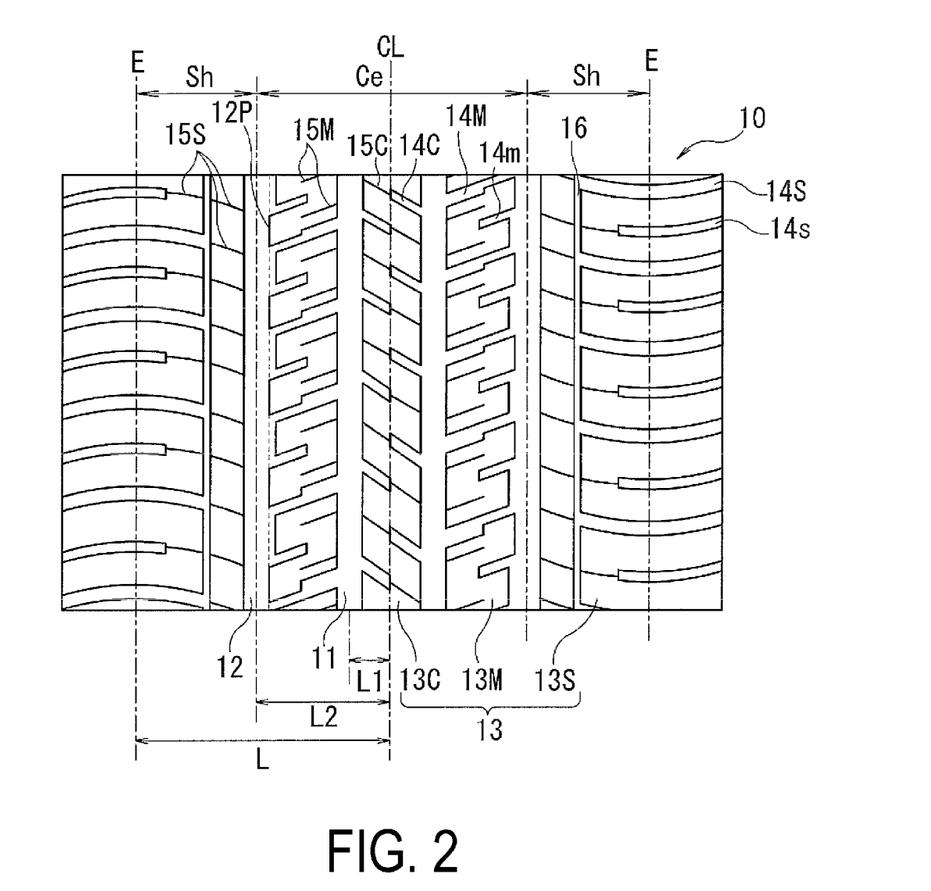
FIG. 2 is a front view illustrating a tread surface of the pneumatic tire according to the embodiment of the present technology.

As illustrated in FIG. 2, four main grooves (two first main grooves 11, two second main grooves 12) extending in the tire circumferential direction are disposed on the outer surface of the tread portion 1, in other words, on a tread surface 10, of the pneumatic tire according to the present technology. The first main grooves 11 are arranged on both sides in the tire width direction of the tire equator CL, and the second main grooves 12 are arranged on the outer side in the tire width direction of the first main grooves 11. The groove widths of the main grooves 11, 12 are, for example, from 4 to 8% of the ground contact width (the distance between the left and right ground contact edges E), and their groove depths are for example, from 6.5 to 9.5 mm.

In the present technology, the arrangement of the main grooves 11, 12 in the tire width direction is limited to predetermined ranges. Specifically, the distance L1 from the tire equator CL to the center in the tire width direction of the first main groove 11 is from 15 to 25% of the distance L from the tire equator CL to the ground contact edge E, and is preferably set in the range of 17 to 21%. Also, the distance L2 from the tire equator CL to the center in the tire width direction of the second main groove 12 is from 50 to 65% of the distance L from the tire equator CL to the ground contact edge E, and is preferably set in the range of 53 to 60%.

Five land portions 13 are partitioned and formed on the tread surface 10 by these main grooves 11, 12. Specifically, one center land portion 13C is partitioned and formed between the pair of first main grooves 11, a pair of intermediate land portions 13M is partitioned and formed between the first main grooves 11 and the second main grooves 12, and a pair of shoulder land portions 13S is partitioned and formed on the outer side in the tire width direction of the second main grooves 12.

A plurality of lug grooves 14 extending in the tire width direction and a plurality of sipes 15 extending in the tire width direction are formed in these five land portions 13 (one center land portion 13C, two intermediate land portions 13M, and two shoulder land portions 13S) (Hereafter the lug grooves disposed in the center land portion 13C are indicated as 14C, the lug grooves disposed in the intermediate land portions 13M are indicated as 14M or 14m, and the lug grooves disposed in the shoulder land portions 13S are indicated as 14S or 14s. Also the sipes disposed in the center land portion 13C are indicated as 15C, the sipes disposed in the intermediate land portions 13M are indicated as 15M, and the sipes disposed in the shoulder land portions 13 S are indicated as 15S). The groove width of the lug grooves 14 is, for example, from 1.5 to 7.0 mm, and the groove depth is, for example, from 3.0 to 7.5 mm. In particular, the groove width of the lug grooves 14S, 14s disposed in the shoulder land portions 13S is, for example, from 10 to 25% of the groove width of the second main grooves 12. The groove width and groove depth of the sipes 15 are smaller than those of the lug grooves 14, the groove width is for example from 0.6 to 1 mm, and the groove depth is from 50 to 60% of the groove depth of the main grooves 11, 12, so even if the sipes 15 traverse the land portions 13, the land portions 13 are not substantially divided.

In the example of FIG. 2, in the center land portion 13C, a combination of a lug groove 14C extending from the first main groove 11 on a first side to the tire equator CL and a sipe 15C extending from the terminating end of the lug groove 14C to the first main groove 11 on a second side in the extension direction of the lug groove 14C, and a combination of a lug groove 14C extending from the first groove 11 on the second side to the tire equator CL and a sipe 15C extending from the terminating end of the lug groove 14C to the first main groove 11 on the first side in the extension direction of the lug groove 14C are disposed alternatingly. In this way the center land portion 13C is not divided by the lug grooves 14C, but is configured as a single rib that is continuous in the tire circumferential direction.

In the example in FIG. 2, in each of the two intermediate land portions 13M, the plurality of lug grooves 14M are disposed communicating with both the first main groove 11 and the second main groove 12, so that the intermediate land portions 13M are configured as a row of blocks with the plurality of blocks arranged in the tire circumferential direction. Note that in the example of FIG. 2, two sipes 15M that communicate with the first main groove and terminate within the block, and one lug groove 14m located between the extensions of the two sipes 15M communicating with the second main groove 12 and terminating within the block are disposed.

In the example in FIG. 2, a plurality of lug grooves (shoulder lug grooves 14S, 14s) that do not communicate with the second main groove 12 are disposed in the two shoulder land portions 13S. In the example in FIG. 2, the shoulder lug grooves 14S, 14s have an arc shape, and the orientation of the arcs on the first side of the tire equator CL is opposite to the orientation of the arcs on the second side. Note that in the example of FIG. 2, two types of shoulder lug grooves 14S, 14s with different termination positions are arranged alternately, and sipes 15S are arranged from the end portions on the second main groove 12 side of the shoulder lug grooves 14S, 14s extending towards the second main groove 12 in the extension direction of the shoulder lug grooves 14S, 14s.

Note that in the example in FIG. 2, an auxiliary groove 16 is disposed in the shoulder land portion 13S extending in the tire circumferential direction so as to connect with the terminating portion of the shoulder lug grooves 14S whose terminating portion is located more towards the second main groove 12 side from among the two types of shoulder lug grooves 14S, 14s.

In the tread pattern configured in this way, when the region on the tire equator CL side of the second grooves 12 is referred to as the center region Ce, and the regions between the second grooves 12 and the ground contact edges E are referred to as the shoulder regions Sh, the groove area ratio Vc of the center region Ce is set larger than the groove area ratio Vs of the shoulder regions Sh. In other words, the relationship between the groove area ratio Vc of the center region Ce and the groove area ratio Vs of the shoulder regions Vs satisfies Vc>Vs. Note that the groove area ratio is the ratio of the sum total of the groove areas of the lug grooves 14 and the sipes 15 included in each land portion to the area of the land portions included in each region. Specifically, the groove area ratio Vc of the center region Ce is the ratio of the sum total of the groove areas of the lug grooves 14C, 14M, and 14m and the sipes 15C, 15M included in the center land portion 13C and the intermediate land portions 13M to the area of the center land portion 13C and the intermediate land portions 13M included in the center region Ce. Also the groove area ratio Vs of the shoulder region Sh is the ratio of the sum total of the groove area of the lug grooves 14S, 14s and the sipes 15S included in the shoulder land portion 13S to the area of the shoulder land portion 13S included in the shoulder region Sh. When the groove width of the main groove (second main groove 12) varies periodically as illustrated in FIG. 2, the groove area ratio is obtained by considering an imaginary line (chain line) connecting the parts where the groove width is narrow to be a groove wall surface, and considering the part on the land portion side of the chain line in the drawing at the portion where the groove width is wide to be included in the lug groove 14.

In the present technology, by configuring the tread pattern as described above, the steering stability performance on dry road surfaces (dry performance), the traveling performance on icy and snowy road surfaces (snow performance), and the noise performance can all be achieved. In other words, as described above, by making the shoulder lug grooves 14S, 14s not communicate with the second main grooves 12, pattern noise is not dissipated to the outside of the vehicle through the shoulder lug grooves 14S, 14s, so the noise performance can be improved. Also, the shoulder land portions 13S are not divided by the lug grooves 14S, 14s, so the stiffness of the shoulder land portions 13S are increased and the dry performance can be improved. On the other hand, when traveling, the groove area ratio of the center region Ce that contacts the ground surface is greater than that of the shoulder regions Sh, so the snow performance can be improved. Also, the first main grooves 11 and the second main grooves 12 are arranged in the ranges as described above, and in particular, the second main grooves 12 are arranged closer to the tire equator CL than conventionally, so the noise performance is improved by reducing the degradation of pattern noise, and the dry performance can be improved.

In this case, if the first main grooves 11 are arranged closer to the tire equator CL than the range described above, the width of the center land portion 13C is too narrow, sufficient stiffness of the center land portion 13C cannot be ensured, and the dry performance deteriorates. If the first main grooves 11 are arranged to the outside in the tire width direction of the range described above, the width of the center land portion 13C becomes too wide, noise radiated from the main grooves increases, and the noise performance deteriorates. If the second main grooves 12 are arranged closer to the tire equator CL than the range described above, the lug groove component is reduced, and the snow performance deteriorates. If the second main grooves 12 are arranged to the outside in the tire width direction of the range described above, noise radiated from the main grooves increases, and the noise performance deteriorates.

Figure 3:
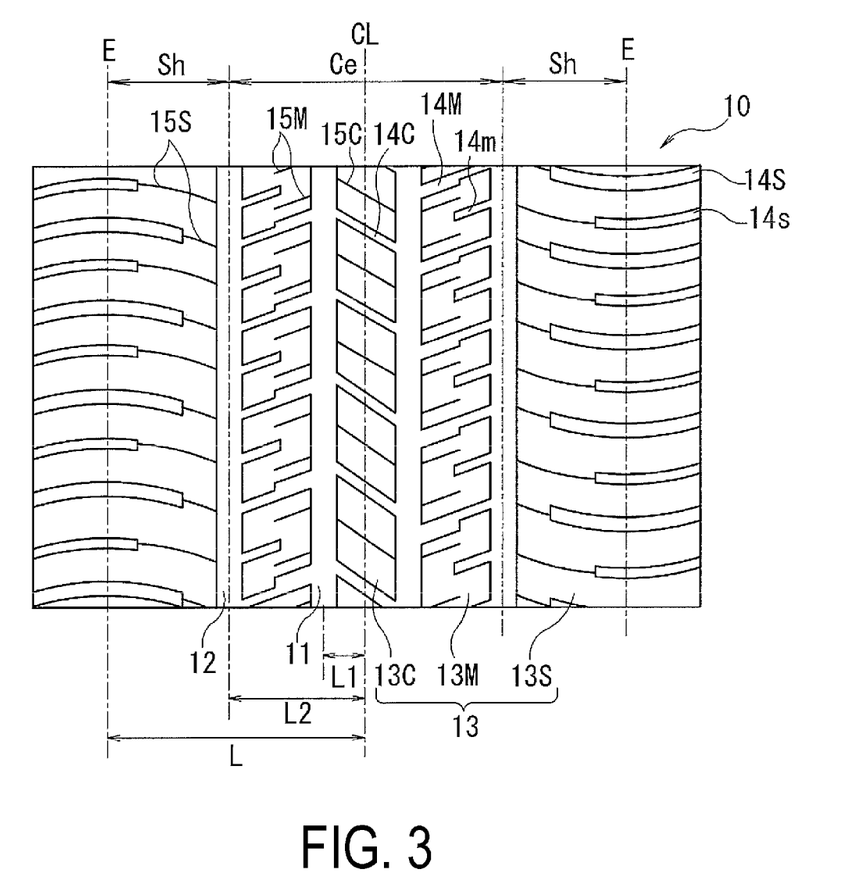
FIG. 3 is a front view illustrating a tread surface of the pneumatic tire according to another embodiment of the present technology.

The center land portion 13C can be a row of blocks with the blocks arranged in the tire circumferential direction as illustrated in FIG. 3, but preferably it is configured as a single rib that is continuous in the tire circumferential direction, as illustrated in FIG. 2. Also, preferably the intermediate land portions 13M are configured as rows of blocks as illustrated in FIG. 2. By configuring the center land portion 13C as a rib, the stiffness of the center land portion 13C is increased, so the response during steering is improved, and the dry performance can be improved. Also, by configuring the intermediate land portions 13M as rows of blocks, snow traction can be ensured, and the snow performance can be increased.

Figure 4:
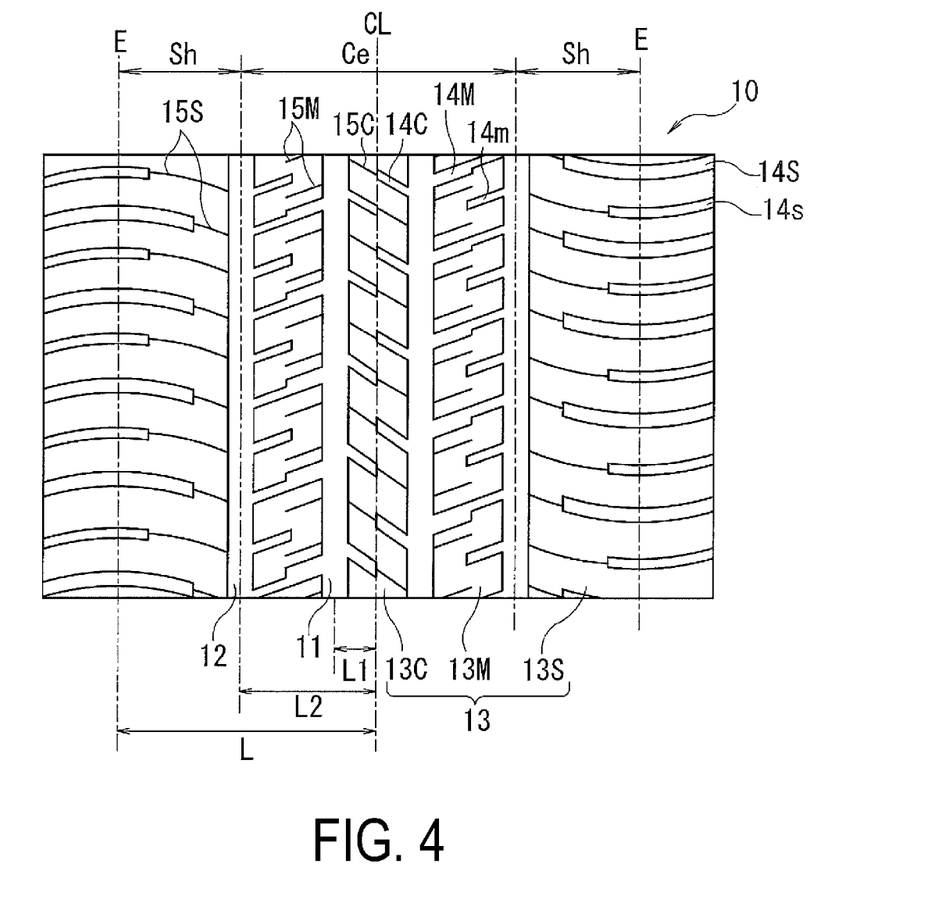
FIG. 4 is a front view illustrating a tread surface of the pneumatic tire according to another embodiment of the present technology.

The lug grooves 14S, 14s and the sipes 15S alone can be disposed in the shoulder land portions 13S as illustrated in FIG. 4, but preferably the auxiliary groove 16 is disposed as illustrated in FIG. 2. When the auxiliary groove 16 is disposed, the groove width thereof should be set in the range from 10 to 25% of the groove width of the second main groove 12. By disposing the auxiliary groove 16 in this way, the groove area in the shoulder land portion 13S is increased, so it is possible to ensure snow traction in the traveling direction. Also, although the groove area increases, the auxiliary groove 16 extends parallel to the second main groove 12 without communicating with the second main groove 12, so there is no adverse effect on the noise performance. In this case, if the groove width of the auxiliary groove 16 is less than the range described above, the effect of providing the auxiliary groove 16 cannot be sufficiently obtained. If the groove width of the auxiliary groove 16 is greater than the range described above, the auxiliary groove 16 becomes substantially equivalent to the main grooves 11, 12, and the shoulder land portion 13S is divided, so the effect of achieving the dry performance, the snow performance, and the noise performance cannot be sufficiently obtained.

As described above, the relationship between the groove area ratio Vc of the center region Ce and the groove area ratio Vs of the shoulder regions Sh satisfies the relationship Vc>Vs, but preferably the ratio Vc/Vs satisfies the relationship 1.03<Vc/Vs<1.10. By setting the relationship between the groove area ratio Vc of the center region Ce and the groove area ratio Vs of the shoulder regions Sh in this way, the difference in stiffness between the center region Ce and the shoulder regions Sh is prevented from becoming too large, and the dry performance and the snow performance can both be achieved. In this case, if the ratio Vc/Vs is smaller than 1.03, there is almost no difference between the groove area ratio Vc of the center region Ce and the groove area ratio Vs of the shoulder regions Sh, so it is difficult to sufficiently improve the snow performance. When the ratio Vc/Vs is greater than 1.10, the difference in stiffness between the center region Ce and the shoulder regions Sh becomes excessively large, and it becomes difficult to achieve both the dry performance and the snow performance in a balanced manner.

Figure 5:
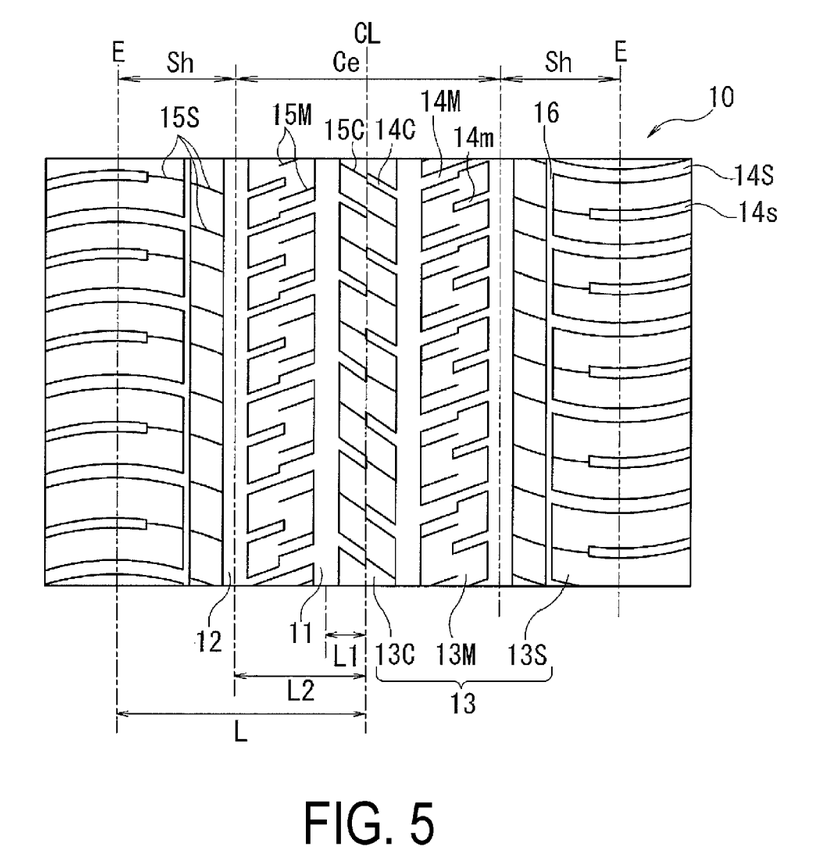
FIG. 5 is a front view illustrating a tread surface of the pneumatic tire according to another embodiment of the present technology.

The groove width of the second main grooves 12 may be constant as illustrated in FIG. 5, but preferably a plurality of point heights 12P are disposed intermittently on the groove side wall of the second main groove on the tire equator side as illustrated in FIG. 2. In other words, the blocks included in the row of blocks from which the intermediate land portions 13M are configured may be formed with parts where the block width is relatively small and parts where the block width is relatively large. In this case, preferably the length in the circumferential direction of the parts where the block width is relatively large is greater than the length in the circumferential direction of the parts where the block width is relatively small. In particular, in the example in FIG. 2, the lug groove 14m is disposed on the second main groove 12 side of the blocks from which the intermediate land portions 13M are configured, communicating with the second main groove 12 and terminating within the block. A first of the two block parts partitioned by this lug groove 14m has a relatively small block width, and the second has a relatively large block width. Also, the second of the two block parts partitioned by the lug groove 14m projects more towards the adjacent block than the block portion on the first main groove 11 side of the terminating portion of the lug groove 14m. Therefore the length in the circumferential direction of the portion with the relatively large block width is greater than the length in the circumferential direction of the portion with the relatively small block width. In this case, by projecting the second of the two block portions partitioned by the lug groove 14m towards the adjacent block, a portion with a narrowed groove width is produced in a portion of the lug groove 14M (the lug groove 14M that divides the intermediate land portion 13M and forms blocks) between the adjacent blocks, but in this portion with the narrowed groove width the groove width is maintained at 1.3 mm or greater. As a result of disposing these point heights 12P in the groove side wall of the second main groove 12 in this way, the groove volume of the second main grooves 12 is increased, and the snow performance can be improved. Also, by making the block shape as described above, in particular, by increasing the length in the circumferential direction of the portion with relatively large block width, the block stiffness can be maintained, so the dry performance can be improved.

In the tread pattern configured as described above, the arrangement of the lug grooves 14 in each of the land portions 13 is varied in various ways, so there is a pitch arrangement with two or more pitch lengths. In this case, preferably the ratio of maximum/minimum pitch length of this pitch arrangement is in the range from 1.25 to 1.40. By making the ratio of pitch lengths small in this way, sufficient snow performance can be obtained from the lug grooves 14, and the variation in stiffness of each block is reduced, so the dry performance can be improved. In other words, excellent snow performance and dry performance can both be obtained from all season pneumatic tires that are used throughout the year.

The tread portion 1 can be configured from a single rubber layer, but preferably is configured from two or more rubber layers that are laminated in the tire radial direction. In this case, preferably the JIS hardness of rubber from which the outermost rubber layer in the tire radial direction is configured is from 60 to 70, the JIS hardness of the rubber from which the outermost rubber layer in the tire radial direction is configured is less than the JIS hardness of rubber from which the innermost rubber layer in the tire radial direction is configured, and the difference in hardness is from 10 to 15. This hardness setting is different from the hardness setting of normal winter tires, such as studless tires or the like (JIS hardness of the rubber layer on the outermost side in the tire radial direction is about 50, and less than the JIS hardness of the rubber layer on the innermost side in the tire radial direction, and the hardness difference is 16 or greater), and the hardness setting of normal tires that are not winter tires (JIS hardness of the rubber layer on the outermost side in the tire radial direction is about 60 to 75, but the JIS hardness of the rubber layer on the outermost side in the tire radial direction is greater than the JIS hardness of the rubber layer on the innermost side in the tire radial direction), but this hardness setting achieves a high level of dry performance and snow performance. In other words, excellent performance can be obtained from all season pneumatic tires that are used throughout the year.

When the tread portion is configured from two or more rubber layers laminated in the tire radial direction in this way, preferably the brittle temperature of the rubber from which the rubber layer on the outermost side in the tire radial direction is configured is −45° C. or lower. By setting the brittle temperature in this way, good snow performance can be obtained. If the brittle temperature of the rubber from which the rubber layer on the outermost side in the tire radial direction is configured is higher than −45° C., the snow performance degrades.

Examples

Twelve pneumatic tires of tire size 225/60R18 were manufactured, having the cross-section illustrated in FIG. 1, and with the basic tread pattern, the groove area ratio Vc in the center region, the groove area ratio Vs in the shoulder regions, the distance from the tire equator to the first main groove as a proportion of the distance from the tire equator to the ground contact edge (position of the first main groove), the distance from the tire equator to the second main groove as a proportion of the distance from the tire equator to the ground contact edge (position of the second main groove), the shape of the shoulder lug grooves, the shape of the center land portion, the shape of the intermediate land portions, the presence/absence of the auxiliary groove, the ratio Vc/Vs, the presence/absence of point heights, the arrangement of point heights, the pitch length ratio, the rubber hardness of the outside rubber layer, the rubber hardness of the inside rubber layer, the rubber hardness difference, and the brittle temperature of the outside rubber layer were set as shown in Table 1, to produce Conventional Example 1, Comparative Examples 1 to 3, and Working Examples 1 to 8.

Note that the tread pattern of Conventional Example 1 had shoulder lug grooves that communicate with the second main groove in the tread pattern of FIG. 3. In all the examples, the tread portion had a laminated structure with two rubber layers, an outside rubber layer and an inside rubber layer.

These 12 types of pneumatic tires were evaluated for dry performance, snow performance, and noise performance by the evaluation methods described below, and the results are also shown in Table 1.

Dry Performance

The test tires were assembled on wheels with a rim size of 18×7.5 JJ, inflated to an air pressure of 220 kPa, and mounted on a test vehicle (front wheel drive vehicle) having an engine displacement of 2,500 cc. Sensory evaluations on a dry road surface were carried out by a test driver. Evaluation results were expressed as index values, Conventional Example 1 being assigned an index value of 100. Larger index values indicate superior steering stability on dry road surfaces (dry performance).

Snow Performance

The test tires were assembled on wheels with a rim size of 18×7.5 JJ, inflated to an air pressure of 220 kPa, and mounted on a test vehicle (front wheel drive vehicle) having an engine displacement of 2,500 cc. Sensory evaluations on an icy and snowy road surface were carried out by a test driver. Evaluation results were expressed as index values, Conventional Example 1 being assigned an index value of 100. Larger index values indicate superior traveling performance on icy and snowy road surfaces (snow performance).

Noise Performance

Each test tire was assembled on a wheel having a rim size of 18×7.5 JJ, inflated to an air pressure of 220 kPa, mounted on a test vehicle (front wheel drive vehicle) of displacement volume 2,500 cc. Pass-by noise was measured in accordance with a measuring method based on the EEC/ECE tire noise regulations, which correspond to the European pass-by noise regulations. The evaluation results were expressed with reference to the measured values for Conventional Example 1, as the difference from the measured value for Conventional Example 1 (dB). The greater the difference (greater negative value) the less the noise relative to Conventional Example 1, and the better the noise performance.

TABLE 1

|  |  | Conventional Example 1 | Comparative Example 1 | Comparative Example 2 | Comparative Example 3 |
|---|---|---|---|---|---|
| Tread Pattern |  | — | FIG. 4 | FIG. 4 | FIG. 4 |
| Groove area ratio Vc of center region | % | 19 | 20 | 20 | 19 |

TABLE 1-continued

|  |  |  |  |  |  |
|---|---|---|---|---|---|
| Groove area ratio Vs of the shoulder region | % | 19 | 18 | 18 | 19 |
| First main groove position | % | 20 | 10 | 30 | 17 |
| Second main groove position | % | 70 | 40 | 70 | 55 |
| Shape of shoulder lug groove |  | Penetrates | Does not penetrate | Does not penetrate | Does not penetrate |
| Shape of center land portion |  | Block | Block | Block | Block |
| Shape of intermediate land portion |  | Block | Block | Block | Block |
| Presence/absence of auxiliary groove |  | Absence | Absence | Absence | Absence |
| Ratio Vc/Vs |  | 1 | 1.11 | 1.11 | 1 |
| Presence/absence of point heights |  | Absence | Absence | Absence | Absence |
| Arrangement of point heights |  | — | — | — | — |
| Pitch length ratio |  | 1.6 | 1.6 | 1.6 | 1.6 |
| Rubber hardness of outside rubber layer |  | 70 | 70 | 70 | 70 |
| Rubber hardness of inside rubber layer |  | 55 | 55 | 55 | 55 |
| Rubber hardness difference |  | −15 | −15 | −15 | −15 |
| Brittle temperature of outside rubber layer | ° C. | −43 | −43 | −43 | −43 |
| Dry performance | Index value | 100 | 97 | 100 | 100 |
| Snow performance | Index value | 100 | 98 | 101 | 98 |
| Noise performance | dB | Baseline | −0.3 | +0.2 | 0 |

|  |  | Working Example 1 | Working Example 2 | Working Example 3 | Working Example 4 | Working Example 5 | Working Example 6 | Working Example 7 | Working Example 8 |
|---|---|---|---|---|---|---|---|---|---|
| Tread Pattern |  | FIG. 4 | FIG. 5 | FIG. 6 | FIG. 6 | FIG. 2 | FIG. 2 | FIG. 2 | FIG. 2 |
| Groove area ratio Vc of center region | % | 20 | 20 | 20 | 19 | 19 | 19 | 19 | 19 |
| Groove area ratio Vs of the shoulder region | % | 18 | 18 | 18 | 18 | 18 | 18 | 18 | 18 |
| First main groove position | % | 17 | 17 | 17 | 17 | 17 | 17 | 17 | 17 |
| Second main groove position | % | 55 | 55 | 55 | 55 | 55 | 55 | 55 | 55 |
| Shape of shoulder lug groove |  | Does not penetrate | Does not penetrate | Does not penetrate | Does not penetrate | Does not penetrate | Does not penetrate | Does not penetrate | Does not penetrate |
| Shape of center land portion |  | Block | Rib | Rib | Rib | Rib | Rib | Rib | Rib |
| Shape of intermediate land portion |  | Block | Block | Block | Block | Block | Block | Block | Block |
| Presence/absence of auxiliary groove |  | Absence | Absence | Presence | Presence | Presence | Presence | Presence | Presence |
| Ratio Vc/Vs |  | 1.11 | 1.11 | 1.11 | 1.06 | 1.06 | 1.06 | 1.06 | 1.06 |
| Presence/absence of point heights |  | Absence | Absence | Absence | Absence | Presence | Presence | Presence | Presence |
| Arrangement of point heights |  | — | — | — | — | Second main groove | Second main groove | Second main groove | Second main groove |
| Pitch length ratio |  | 1.6 | 1.6 | 1.6 | 1.6 | 1.6 | 1.35 | 1.35 | 1.35 |
| Rubber hardness of outside rubber layer |  | 70 | 70 | 70 | 70 | 70 | 70 | 64 | 64 |
| Rubber hardness of inside rubber layer |  | 55 | 55 | 55 | 55 | 55 | 55 | 77 | 77 |
| Rubber hardness difference |  | −15 | −15 | −15 | −15 | −15 | −15 | 13 | 13 |
| Brittle temperature of outside rubber layer | ° C. | −43 | −43 | −43 | −43 | −43 | −43 | −43 | −47 |
| Dry performance | Index value | 101 | 102 | 102 | 103 | 103 | 104 | 107 | 107 |
| Snow performance | Index value | 101 | 102 | 103 | 103 | 104 | 104 | 105 | 107 |
| Noise performance | dB | −0.1 | −0.2 | −0.2 | −0.3 | −0.3 | −0.3 | −0.5 | −0.5 |

As can be seen from Table 1, each of Working Examples 1 to 8 had improved dry performance, snow performance, and noise performance compared with Conventional Example 1.

On the other hand, in the case of Comparative Example 1 in which the first main grooves and the second main grooves were shifted towards the center compared with the prescribed ranges, the dry performance and the snow performance were degraded compared with Conventional Example 1. In the case of Comparative Example 2 in which the first main grooves and the second main grooves were shifted towards the outer side in the tire width direction compared with the prescribed ranges, the noise performance was degraded compared with Conventional Example 1. In the case of Comparative Example 3 in which the magnitude relationship between the groove area ratio of the center region and the groove area ratio of the shoulder regions did not satisfy the prescription of the present technology, the snow performance was degraded.

The invention claimed is:

1. A pneumatic tire comprising:
   four main grooves extending in a tire circumferential direction on a tread surface, the four main grooves including a pair of first main grooves disposed on either side in a tire width direction of a tire equator and a pair of second main grooves disposed on an outer side in the tire width direction of the first main grooves;
   five land portions partitioned and formed by the first main grooves and the second main grooves, the five land portions including
   a single center land portion disposed between the pair of first main grooves,
   a pair of intermediate land portions disposed between the first main grooves and the second main grooves, and
   a pair of shoulder land portions disposed on an outer side in the tire width direction of the second main grooves, each shoulder land portion of the pair of shoulder land portions comprises a rib and the rib is divided only by sipes,
   a plurality of lug grooves extending in the tire width direction; and
   a plurality of sipes extending in the tire width direction,
   the plurality of lug grooves and the plurality of sipes being formed in the five land portions, wherein
   of the plurality of lug grooves, shoulder lug grooves formed in the shoulder land portions do not communicate with the second main grooves, a groove area ratio Vc of a center region on a tire equator side of the second main grooves obtained as a ratio of a sum total of a groove area of the lug grooves and the sipes included in the center land portion and the intermediate land portions to an area of the center land portion and the intermediate land portions, and a groove area ratio Vs of the shoulder regions between the second main grooves and ground contact edges obtained as a ratio of a sum total of a groove area of the lug grooves and the sipes included in the shoulder land portions to an area of the shoulder land portions satisfy a relationship Vc>Vs, a distance from the tire equator to a center in the tire width direction of the first main grooves is set in a range from 15 to 25% of a distance from the tire equator to the ground contact edge, and a distance from the tire equator to a center in the tire width direction of the second main grooves is set in a range from 50 to 65% of the distance from the tire equator to the ground contact edge.

2. The pneumatic tire according to claim 1, wherein the shoulder land portions include an auxiliary groove extending in the tire circumferential direction, having a groove width from 10 to 25% of a groove width of the second main groove.

3. The pneumatic tire according to claim 1, wherein a ratio Vc/Vs of the groove area ratio Vc of the center region and the groove area ratio Vs of the shoulder regions satisfies a relationship 1.03<Vc/Vs<1.10.

4. The pneumatic tire according to claim 1, wherein a plurality of point heights are disposed intermittently in a groove side wall on the tire equator side of the second main grooves, forming portions where a block width is relatively small and portions where the block width is relatively large in blocks from which the intermediate land portions are configured, and a length in the circumferential direction of the portions where the block width is relatively large is greater than a length in the circumferential direction of the portions where the block width is relatively small.

5. The pneumatic tire according to claim 1, wherein a tread pattern formed on a surface of the tread portion has a pitch arrangement that includes two or more pitch lengths, and a maximum/minimum pitch length ratio in the pitch arrangement is in a range from 1.25 to 1.40.

6. The pneumatic tire according to claim 1, wherein the tread portion is configured from two or more rubber layers laminated in a tire radial direction, a JIS hardness of rubber from which a rubber layer on an outermost side in the tire radial direction is configured is from 60 to 70, the JIS hardness of rubber from which the rubber layer on the outermost side in the tire radial direction is configured is less than a JIS hardness of rubber from which a rubber layer on an innermost side in the tire radial direction is configured, and the hardness difference is from 10 to 15.

7. The pneumatic tire according to claim 1, wherein when the tread portion is configured from two or more rubber layers laminated in the tire radial direction, a brittle temperature of the rubber from which the rubber layer on the outermost side in the tire radial direction is configured is −45° C. or lower.

8. The pneumatic tire according to claim 1, the center land portion extends from one of the first main grooves to another of the first main grooves.

9. The pneumatic tire according to claim 1, wherein each of the intermediate land portions extends from one of the first main grooves to one of the second main grooves.

10. The pneumatic tire according to claim 1, wherein the center land portion is configured as a single rib continuous in the tire circumferential direction, and the intermediate land portions are configured as rows of blocks in which a plurality of blocks are arranged in the tire circumferential direction.

11. The pneumatic tire according to claim 10, wherein the shoulder land portions include an auxiliary groove extending in the tire circumferential direction, having a groove width from 10 to 25% of a groove width of the second main groove.

12. The pneumatic tire according to claim 11, wherein a ratio Vc/Vs of the groove area ratio Vc of the center region and the groove area ratio Vs of the shoulder regions satisfies a relationship 1.03<Vc/Vs<1.10.

13. The pneumatic tire according to claim 12, wherein a plurality of point heights are disposed intermittently in a groove side wall on the tire equator side of the second main grooves, forming portions where a block width is relatively small and portions where the block width is relatively large in blocks from which the intermediate land portions are configured, and a length in the circumferential direction of the portions where the block width is relatively large is greater than a length in the circumferential direction of the portions where the block width is relatively small.

14. The pneumatic tire according to claim 13, wherein a tread pattern formed on a surface of the tread portion has a pitch arrangement that includes two or more pitch lengths, and a maximum/minimum pitch length ratio in the pitch arrangement is in a range from 1.25 to 1.40.

15. The pneumatic tire according to claim 14, wherein the tread portion is configured from two or more rubber layers laminated in a tire radial direction, a JIS hardness of rubber from which a rubber layer on an outermost side in the tire radial direction is configured is from 60 to 70, the JIS hardness of rubber from which the rubber layer on the outermost side in the tire radial direction is configured is less than a JIS hardness of rubber from which a rubber layer on an innermost side in the tire radial direction is configured, and the hardness difference is from 10 to 15.

16. The pneumatic tire according to claim 15, wherein when the tread portion is configured from two or more rubber layers laminated in the tire radial direction, a brittle temperature of the rubber from which the rubber layer on the outermost side in the tire radial direction is configured is −45° C. or lower.

* * * * *